United States Patent [19]

Roger

[11] 4,375,043
[45] Feb. 22, 1983

[54] SYSTEM FOR FIXING STATOR WINDING BARS OF A DYNAMO-ELECTRIC ROTATING MACHINE

[75] Inventor: Gillet Roger, Belfort, France

[73] Assignees: Alsthom-Atlantique; Electricite de France, both of Paris, France

[21] Appl. No.: 290,636

[22] Filed: Aug. 6, 1981

[30] Foreign Application Priority Data

Aug. 7, 1980 [FR] France .................. 80 17445

[51] Int. Cl.³ .......................................... H02K 3/47
[52] U.S. Cl. .................................. 310/258; 310/214
[58] Field of Search ............. 310/194, 214, 254, 258

[56] References Cited

U.S. PATENT DOCUMENTS

| | | | |
|---|---|---|---|
| 1,756,672 | 4/1930 | Barr | |
| 3,405,297 | 10/1968 | Madsen | 310/258 |
| 4,137,471 | 1/1979 | Sato et al. | 310/258 X |
| 4,278,905 | 7/1981 | Chari et al. | 310/258 X |

FOREIGN PATENT DOCUMENTS

| | | |
|---|---|---|
| 1464588 | 11/1966 | France . |
| 2167690 | 8/1973 | France . |
| 2287798 | 5/1976 | France . |
| 2324145 | 4/1977 | France . |
| 2331184 | 6/1977 | France . |
| 2401539 | 3/1979 | France . |

*Primary Examiner*—John Gonzales
*Attorney, Agent, or Firm*—Sughrue, Mion, Zinn, Macpeak and Seas

[57] ABSTRACT

The stator winding bars (12) e.g. of an alternator are fixed to the magnetic circuit (2) by means of teeth (14, 16) fixed on the cylindrical inner surface (44) of said circuit and protruding inwardly therefrom. Successive teeth going circumferentially round the cylindrical surface are alternately long teeth (14) and short teeth (16). The bars are tangentially wedged by wedges (28) driven radially between the bars and the side walls of the short teeth (16). The bars are held radially by plates (30) which are kept in position by means of tapering pins (32) driven tangentially into holes (44) provided in the heads (29) of the long teeth (14).

4 Claims, 6 Drawing Figures

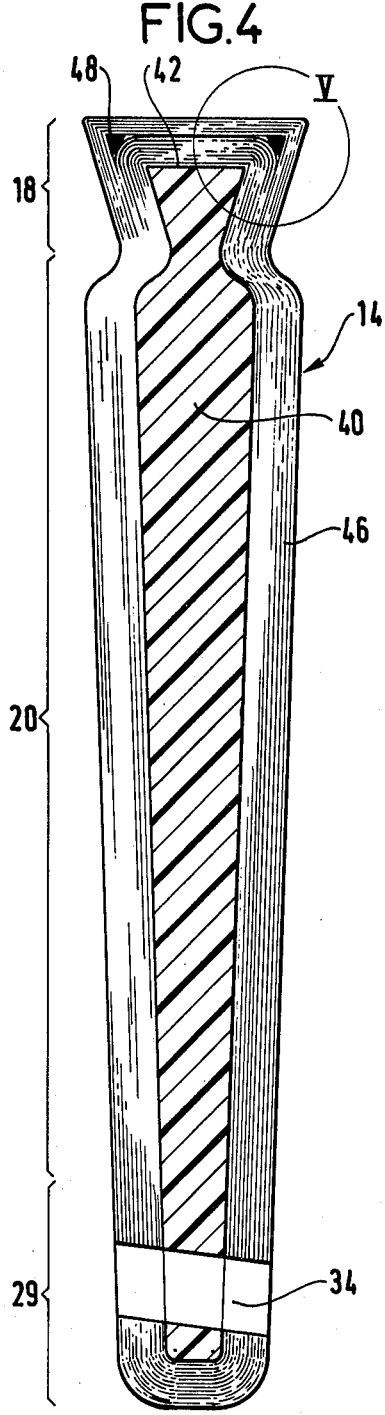
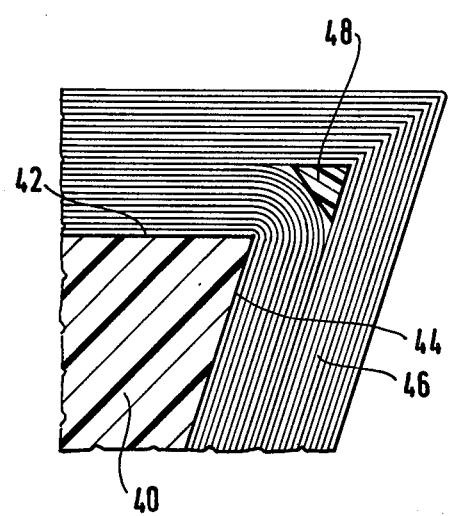

dddd
SYSTEM FOR FIXING STATOR WINDING BARS OF A DYNAMO-ELECTRIC ROTATING MACHINE The present invention relates to a system for fixing stator winding bars of a dynamo-electric machine whose stator is of the type herein referred to as "slotless".

BACKGROUND OF THE INVENTION

A "slotless" stator winding has bars which, instead of being wedged in the bottoms of slots formed in the magnetic circuit of the stator, are applied against the cylindrical inner surface thereof.

The system by which the bars are fixed requires some form of fixing means for fixing the bars to the stator magnetic circuit. Various fixing means e.g. screws or dovetail joints have been used. They engage the magnetic circuit and serve to allow the bars to be pulled radially outwards until they press against the inner surface of the magnetic circuit. Since the fixing means penetrate into the magnetic circuit to obtain a radial purchase thereon, the same fixing system can be used simultaneously to prevent the winding bars from moving tangentially, i.e. to prevent their angular positions form varying.

Known fixing systems for fixing bars to the magnetic circuit suffer from disadvantages.

They are not very compact because they use insulating screws whose poor mechanical characteristics require them to be of large dimensions.

Metal laminations are used in the rotor-stator air gap. These laminations constitute protruding bar-fixing teeth whose bases are dovetailed into the stator magnetic circuit. The metal laminations are not magnetic and provide good mechanical strength for the fixing teeth but they suffer losses by the Joule effect because of the high and variable magnetic inductions (see FIG. 8 of U.S. Pat. No. 3,405,297 in the name of Madsen).

Dismantling to obtain access to the bars is difficult. Dismantling is necessary from time to time to ensure the bars are completely unable to move or to change the bars when they have come loose after long service or when a bar is damaged.

The greater the number of wedges to be driven in radially, tangentially or longitudinally in known devices to make the bars both tangentially and radially motionless relative to the teeth, the longer and more expensive both assembly and disassembly.

The present invention aims to produce a system for fixing stator winding bars of a dynamo-electric rotating machine which system allows for the use of insulating fixing teeth while facilitating assembly, disassembly and repairs while remaining suitably compact.

SUMMARY OF THE INVENTION

The present invention provides a fixing system for fixing stator winding bars of a dynamo-electric rotating machine having a rotor and a stator, and said stator having a magnetic circuit with an inner surface that is generally cylindrical about the axis of rotation of the rotor, said system serving to fix said bars in the gap between the rotor and the stator magnetic circuit, said bars extending in a "longitudinal" direction parallel to the axis of rotation of the rotor, and being fixed by being pressed against said inner surface of the stator magnetic circuit; said fixing system comprising:

non-metal fixing teeth which are generally prismatic with longitudinal generator lines, said teeth each having a foot fixed to the stator magnetic circuit and a body which protrudes radially inwards from the inner surface of said magnetic circuit, said teeth being spaced out angularly all around said inner surface;

tangential wedges to wedge the winding bars between the bodies of the angularly adjacent teeth; and radial wedges to prevent radial movement of said winding bars relative to the bodies of said teeth by pressing said bars against the inner surface of the stator magnetic circuit;

wherein the angularly adjacent fixing teeth are alternately long and short with only the long teeth having heads that protrude radially inwards beyond said winding bars;

said tangential wedges of the bars being radially driven outwards and each being inserted between winding bars and the side of one tooth to clamp each of said bars between a tangential wedge and the side of the other tooth;

the radial wedges for said bars having plates fixed to the heads of only the long teeth, which plates extend tangentially between said long tooth heads to press radially outwards against the surfaces of said winding bars disposed between these long teeth.

It can thus be seen that with the present invention the force required to cause all the bars to press radially against the inner surface of the magnetic circuit is provided by only every other fixing tooth, even though the tooth is not made of metal. It should be observed that the invention nevertheless uses all the teeth to stand up to tangential forces.

BRIEF DESCRIPTION OF THE DRAWINGS

With reference to the attached diagrammatic figures, a description is given hereinafter by way of a non-limiting example of how the invention can be put into effect. It must be understood that without going beyond the scope of the invention, the components described and illustrated can be replaced by other components which perform the same technical functions. When the same component is illustrated in several figures, it bears the same reference symbol therein.

FIG. 2 is a perspective view of a long tooth of the system of FIG. 1, with two blocking wedges which are longitudinally driven in.

FIG. 4 is a cross-section through a long tooth of the system, the section plane being perpendicular to the axis of the machine.

FIG. 5 illustrates a detail V of FIG. 4.

DESCRIPTION OF PREFERRED EMBODIMENT

Figure 1:
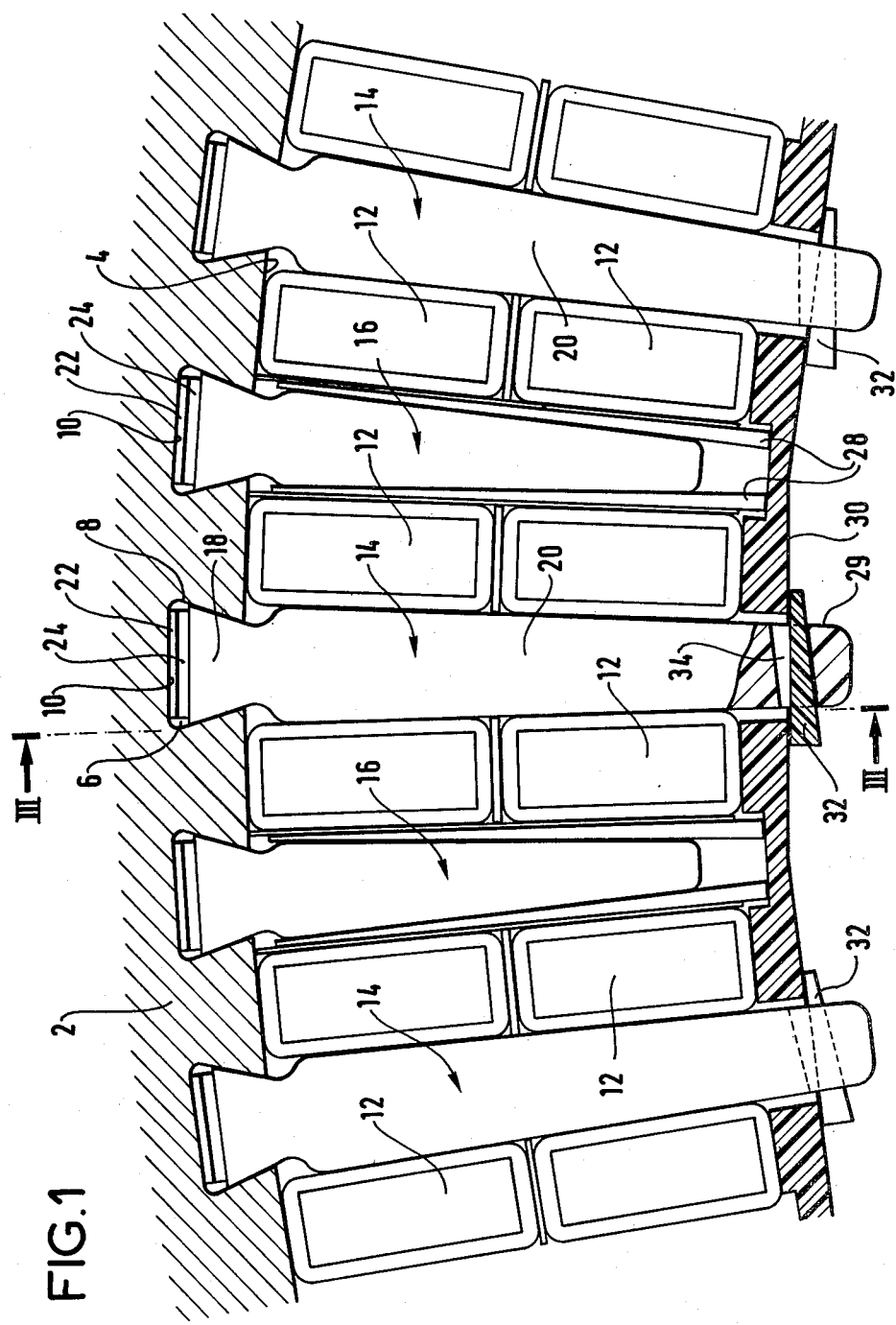
FIG. 1 is a diagrammatic view of a part of a system in accordance with the invention, showing a cross-section through a plane perpendicular to the axis of the machine.

The system which is described hereinafter is installed on the magnetic circuit 2 of the stator of a power alternator whose rotor rotates about an axis which is not shown in the figures and is perpendicular to the plane of FIG. 1. This axis is that of the machine and also that of the inside surface 4 of the magnetic circuit, which surface is cylindrical. The "longitudinal" direction, is defined as being parallel to the axis. The "radial" direction is defined as being at right-angles to the axis. The "tangential" direction is defined at any given point as being perpendicular both to the axis and to the radial direction passing through said given point.

The stator magnetic circuit 2 is conventionally constituted by magnetic steel laminations extending perpendicular to the axis and stacked longitudinally.

Longitudinal slots 6 of trapezoidal cross-section with the small base of each trapezium coinciding substantially with the inner surface 4 of the magnetic circuit are formed in the inner surface. These slots are spaced out angularly and uniformly. Each of them has two side surfaces 8 and a bottom 10. They enable conventional connection to be made by dovetail joints.

Winding bars 12 are disposed longitudinally and are fixed to and bear against the surface in each gap between a pair of slots 6. They are held by means of the fixing system which will now be described.

The system includes fixing teeth such as 14 and 16 fixed in the slots 6 by longitudinally engaging them from one end of a magnetic circuit. Each of the teeth has a generally prismatic shape with longitudinal generator lines and has:

a foot 18 whose cross-section is generally trapezoidal with its large base and its small base disposed in the "tangential" direction and two sides which connect these bases together; and a body 20 which extends in the "radial" direction from the small base of the trapezium.

Figure 2:
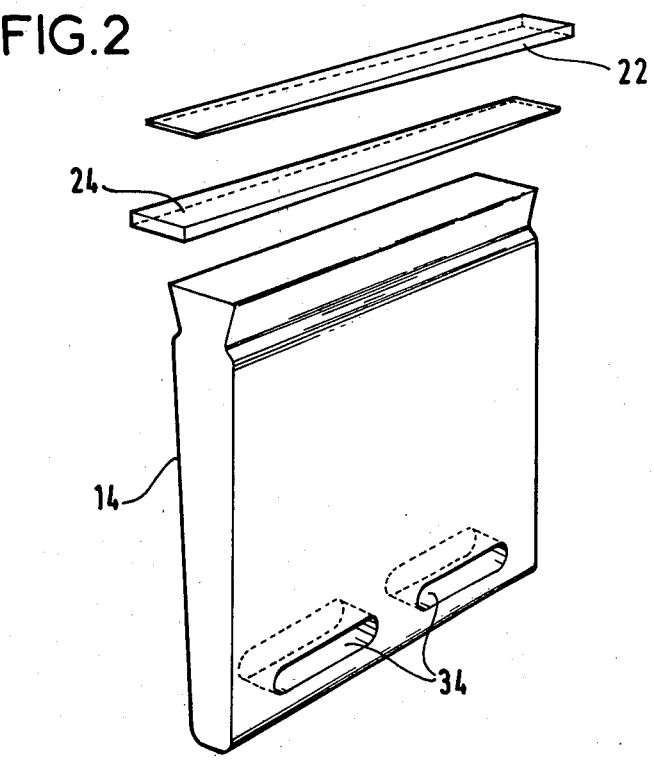

These teeth are fixed by engaging their feet 18 in the slots 6. The bodies of the teeth protrude radially inwards from the inside surface 4 of the magnetic circuit. The teeth are provided with radial wedges 22 and 24 which are longitudinally driven in and which are disposed between the large bases of the feet 18 of the teeth 14 and the bottoms 10 of the slots 6 in which the feet are engaged, to push the feet radially inwards and thus to keep the feet tangentially compressed by pressing them permanently against the side surfaces of the slots. There are two such wedges per tooth so as to provide uniform radial pressure, namely, an outer wedge 22 which cooperates with an inner wedge 24 (see FIG. 2).

Figure 3:
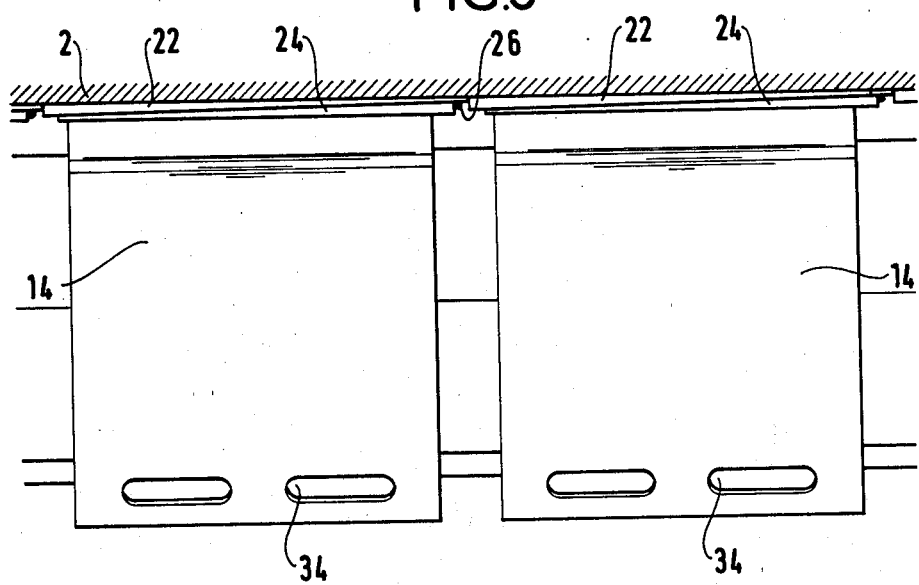
FIG. 3 is a side view along a line III—III of FIG. 1 of two longitudinally successive long teeth, the plane of this figure is parallel to the axis of the machine.

As shown in FIG. 3, a gap is provided between a pair of teeth which succeed each other longitudinally with their feet engaged in the same longitudinal slot, so as to allow the wedges to be driven in without removing the teeth. The outer wedges 22 are longer than the inner wedges 24 and follow one another longitudinally without gaps in between, while the short inner wedges 24 are locked in place by small quantities of adhesive 26 after wedging.

The internal constitution of the teeth is described further on. It uses electrically insulating materials which prevent electric losses while ensuring that the teeth are very rigid and strong enough mechanically.

Successive fixing teeth in the circumferential direction are alternately a long tooth 14 and a short tooth 16. Only the long teeth have heads 29 which protrude inwardly beyond the winding bars.

The bars 12 are wedged tangentially by wedges 28 urged radially outwardly and inserted between the winding bars 12 and the sides of the short teeth 16, the short teeth being narrower than the long teeth in the tangential direction to accomodate said wedges.

The radial wedges 28 are held by plates 30 each fixed to the heads 29 of two adjacent long teeth 14, said plates 30 extending tangentially from one of the heads to the other to press radially outwards against the exposed surfaces of the winding bars 12 disposed between these two long teeth.

The plates 30 are radially fixed and wedged by tapering pins 32 which are tangentially inserted and engage in holes 34 in the heads of the long teeth 14.

The internal constitution of the teeth, which is the same for the long teeth 14 and for the short teeth 16, will now be described.

Each of these teeth has:

a core 40 e.g. of stratified glass mat and epoxy resin which extends along the whole length of the tooth, with a trapezium-shaped part of the core being disposed inside the foot 18 of the tooth and having a base surface 42 parallel to and opposite the middle of the large base of the foot 18, and two sloping side surfaces 44 which extend towards the body 20 of the tooth from the side edges of the base surface 42, these side surfaces sloping towards each other up to a point where the core 40 widens out to extend along the body portion 20 of the tooth; and a covering 46 applied to the core, said covering having a substantially constant thickness and forming at least the large base and the two sides of the foot 18 and the side walls of the body 20 of the tooth, this covering being constituted by superposing layers of sheathing fabric which are disposed simultaneously parallel to the longitudinal direction and, in a cross-section of a plane which is perpendicular to this direction, along the surfaces of the teeth, these layers being impregnated with a hard resin so that the foot 18 of the tooth has high resistance to radially inward traction forces and so that the tooth as a whole has high resistance to bending forces about longitudinal axes. The resin is preferably epoxy resin, and naturally it sets after the fabric has been wound onto the core.

Rectilinear inserts 48 are disposed longitudinally between two layers of fabric of the covering 46 in each of the two base angles formed at the two side edges of the large base of the foot 18 so that these angles are not excessively rounded.

The core 40 which extends not only in the foot 18 but also in the body of each tooth 14 has a neck in the tangential direction in the neighbourhood of the small base of the foot 18 of the tooth.

Figure 6:
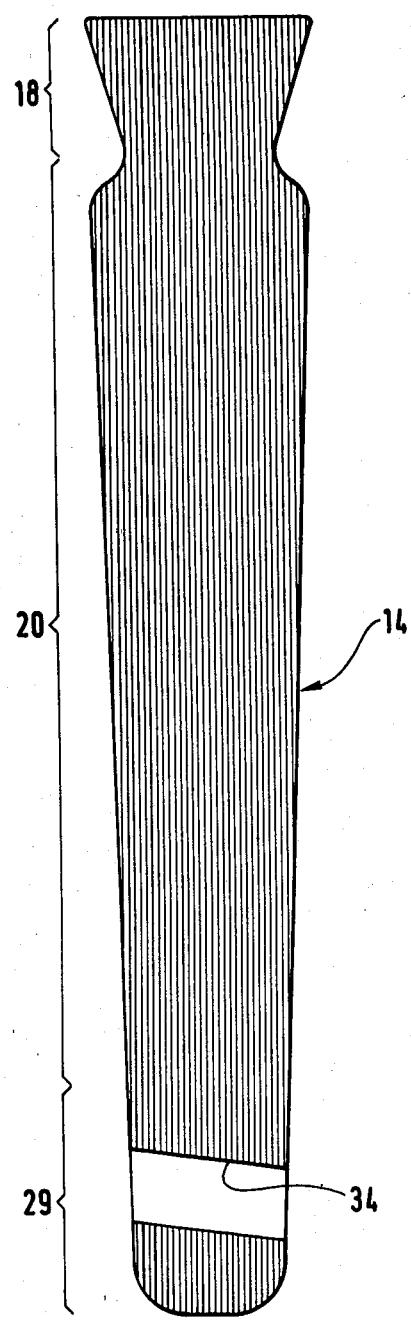
FIG. 6 is a cross-section through a variant long tooth which may be used instead of the tooth shown in FIG. 4.

The internal constitution of the teeth, which has just been described seems to be that which makes it easiest, using insulating materials, to provide the necessary mechanical strength and rigidity. However, any other internal constitution by which these same qualities can be obtained could be used equally well within the scope of the invention. It would be possible, for example, in some cases to use teeth of the type illustrated in FIG. 6, the tooth then being formed by simple superposition of parallel layers of sheathing fabric impregnated with resin and shaped subsequently.

I claim:

1. A fixing system for fixing stator winding bars of a dynamo-electric rotating machine having a rotor and a stator, and said stator having a magnetic circuit with an inner surface that is generally cylindrical about the axis of rotation of the rotor, said system serving to fix said bars in the gap between the rotor and the stator magnetic circuit, said bars extending in a "longitudinal" direction parallel to the axis of rotation of the rotor, and being fixed by being pressed against said inner surface of the stator magnetic circuit; said fixing system comprising:

non-metal fixing teeth which are generally prismatic with longitudinal generator lines, said teeth each having a foot fixed to the stator magnetic circuit and a body which protrudes radially inwards from the inner surface of said magnetic circuit, said teeth being spaced out angularly all around said inner surface;

tangential wedges wedging the winding bars between the bodies of the angularly adjacent teeth; and radial wedges to prevent radial movement of said winding bars relative to the bodies of said teeth by pressing said bars against the inner surface of the stator magnetic circuit;

the improvement wherein the angularly adjacent fixing teeth are alternately long and short with only the long teeth having heads that protrude radially inwards beyond said winding bars;

said tangential wedges of the bars being radially driven outwards and each being inserted between winding bars and the side of one tooth to clamp each of said bars between a tangential wedge and the side of the other tooth;

said radial wedges being parallel to said bars having plates fixed to the heads of only the long teeth, which plates extend tangentially between said long tooth heads and pressing radially outwards against the surfaces of said winding bars disposed between said long teeth.

2. A system according to claim 1, wherein said radially driven wedges are held radially by said plates.

3. A system according to claim 1, wherein the plates are radially fixed and wedged by tapering pins driven tangentially and engaged in holes in the heads of the long teeth with each plate extending between the heads of two adjacent long teeth.

4. A system according to claim 1, wherein the radially driven wedges are inserted between the winding bars and the sides of the short teeth only whereby said bars are clamped against the sides of the long teeth, and wherein the short teeth are narrower than the long teeth in the tangential direction to accomodate said wedges.

* * * * *